(12) United States Patent
Kang

(10) Patent No.: US 11,233,285 B2
(45) Date of Patent: Jan. 25, 2022

(54) MULTILAYERED CYLINDRICAL BATTERY MODULE HAVING HEAT DISSIPATION AND CHAIN IGNITION PREVENTING STRUCTURE AND BATTERY PACK COMPRISING SAME

(71) Applicant: LG CHEM, LTD., Seoul (KR)

(72) Inventor: Choon-Kwon Kang, Daejeon (KR)

(73) Assignee: LG Chem, Ltd., Seoul (KR)

( * ) Notice: Subject to any disclaimer, the term of this patent is extended or adjusted under 35 U.S.C. 154(b) by 155 days.

(21) Appl. No.: 16/615,241

(22) PCT Filed: Jan. 8, 2019

(86) PCT No.: PCT/KR2019/000293
§ 371 (c)(1),
(2) Date: Nov. 20, 2019

(87) PCT Pub. No.: WO2019/143060
PCT Pub. Date: Jul. 25, 2019

(65) Prior Publication Data
US 2020/0203788 A1    Jun. 25, 2020

(30) Foreign Application Priority Data
Jan. 17, 2018    (KR) .................. 10-2018-0005920

(51) Int. Cl.
*H01M 2/10*    (2006.01)
*H01M 10/613*    (2014.01)
*H01M 10/625*    (2014.01)
*H01M 10/643*    (2014.01)
*H01M 10/653*    (2014.01)
*H01M 10/6551*    (2014.01)
*H01M 50/20*    (2021.01)

(52) U.S. Cl.
CPC ....... *H01M 10/643* (2015.04); *H01M 10/613* (2015.04); *H01M 10/625* (2015.04); *H01M 10/653* (2015.04); *H01M 10/6551* (2015.04); *H01M 50/20* (2021.01); *H01M 2220/20* (2013.01)

(58) Field of Classification Search
CPC .. H01M 10/643; H01M 50/20; H01M 10/613; H01M 10/625; H01M 10/653; H01M 10/6551; H01M 2220/20; H01M 50/30; H01M 10/6553; H01M 50/213; Y02E 60/10
See application file for complete search history.

(56) References Cited

U.S. PATENT DOCUMENTS

| | | |
|---|---|---|
| 2008/0268328 A1 | 10/2008 | Lee et al. |
| 2009/0123819 A1 | 5/2009 | Kim |
| 2010/0266880 A1 | 10/2010 | Hirakawa et al. |
| 2011/0045334 A1* | 2/2011 | Meintschel ........... H01M 50/20 429/120 |
| 2011/0151297 A1 | 6/2011 | Shimizu et al. |
| 2011/0189525 A1 | 8/2011 | Palanchon et al. |
| 2011/0195284 A1* | 8/2011 | Yasui .................... H01M 50/30 429/82 |
| 2012/0021260 A1 | 1/2012 | Yasui et al. |
| 2012/0189885 A1 | 7/2012 | Kishii et al. |
| 2014/0178723 A1 | 6/2014 | Tsujioka et al. |
| 2014/0178737 A1* | 6/2014 | Obrist ................. H01M 10/658 429/120 |
| 2016/0285142 A1 | 9/2016 | Kimura |
| 2017/0133723 A1 | 5/2017 | Yang et al. |

FOREIGN PATENT DOCUMENTS

| | | |
|---|---|---|
| EP | 2290731 A1 | 3/2010 |
| EP | 2 744 033 A1 | 6/2014 |
| JP | 2007-095483 A | 4/2007 |
| JP | 2009-211907 A | 9/2009 |
| JP | 2010-140695 A | 6/2010 |
| JP | 2011-507199 A | 3/2011 |
| JP | 2012-204287 A | 10/2012 |

(Continued)

OTHER PUBLICATIONS

International Search Report issued in corresponding International Patent Application No. PCT/KR2019/000293, dated Apr. 22, 2019.

(Continued)

*Primary Examiner* — Muhammad S Siddiquee
(74) *Attorney, Agent, or Firm* — Morgan, Lewis & Bockius LLP

(57) ABSTRACT

A multilayer battery module includes first cylindrical battery cells arranged standing in lateral and longitudinal directions into a matrix form; second cylindrical battery cells arranged standing on the first cylindrical battery cells with each one of the second cylindrical battery cells in a one-to-one relationship with a corresponding one of the first cylindrical battery cells; and a heatsink of high thermal conductivity between the first and second cylindrical battery cells. The first and second cylindrical battery cells and are disposed so that positive electrode terminals and negative electrode terminals face each other with the heatsink being interposed therebetween. A portion of the heatsink facing each respective positive electrode terminal is recessed to form a heat and gas discharge path, and a portion of the heatsink facing each respective negative electrode terminal contacts the respective negative electrode terminal to form a heat dissipation path.

10 Claims, 11 Drawing Sheets

(56) References Cited

FOREIGN PATENT DOCUMENTS

| JP | 2013-030384 A | 2/2013 |
| JP | 5496576 B2 | 5/2014 |
| KR | 10-0776767 B1 | 11/2007 |
| KR | 10-0839374 B1 | 6/2008 |
| KR | 10-2009-0048861 A1 | 5/2009 |
| KR | 10-0949334 B1 | 3/2010 |
| KR | 10-2011-0040931 A | 4/2011 |
| KR | 10-2012-0125328 A | 11/2012 |
| KR | 10-2017-0011001 A | 2/2017 |
| KR | 10-1800334 B1 | 11/2017 |
| WO | 2011/092773 A1 | 8/2011 |
| WO | 2012/014418 A1 | 2/2012 |
| WO | 2013/021573 A1 | 2/2013 |

OTHER PUBLICATIONS

First Office Action dated Nov. 16, 2020, issued in corresponding Japanese Patent Application No. 2019-566284.
Extended European Search Report issued in corresponding European Patent Application No. 19741550.8, dated Oct. 13, 2020.

* cited by examiner

MULTILAYERED CYLINDRICAL BATTERY MODULE HAVING HEAT DISSIPATION AND CHAIN IGNITION PREVENTING STRUCTURE AND BATTERY PACK COMPRISING SAME

TECHNICAL FIELD

The present disclosure relates to a cylindrical secondary battery module, and more particularly, to a multilayer cylindrical secondary battery module having a heat dissipation and chain ignition prevention structure for cylindrical secondary batteries arranged in a layered form.

The present application claims priority to Korean Patent Application No. 10-2018-0005920 filed on Jan. 17, 2018 in the Republic of Korea, the disclosures of which are incorporated herein by reference.

BACKGROUND ART

A secondary battery may be classified into a can-type secondary battery in which an electrode assembly is included in a metal can and a pouch-type secondary battery in which an electrode assembly is included in a pouch made of an aluminum sheet, depending on the shape of the exterior. Here, the can-type secondary battery may also be classified into a cylindrical battery and a rectangular battery depending on the shape of the metal can.

The pouch-type secondary battery has advantages of easy stacking and high energy density, but it is vulnerable to an external impact due to low mechanical rigidity. Meanwhile, the can-type secondary battery is evaluated as being better than the pouch-type secondary battery in terms of safety due to good durability. Thus, the cylindrical secondary batteries are widely used in a battery module or a battery pack applied to environment-friendly electric vehicles in addition to the pouch-type secondary batteries.

However, in the cylindrical secondary batteries, heat is generated in the charging and discharging process because the charging and discharging process is performed by electrochemical reaction. At this time, if heat is not properly dissipated, the cylindrical secondary batteries may be degraded faster and, in some cases, ignition or explosion may occur. Here, if any one of the cylindrical secondary batteries is exploded, the explosion may cause a series explosion of other neighboring cylindrical secondary batteries. Thus, heat dissipation of the cylindrical secondary battery is very important especially for the secondary battery module to which the multilayer assembly method is applied.

In general, the cylindrical secondary battery has a current interruptive device (CID) and a safety vent for interrupting the current during abnormal operation of the battery and for relieving the internal pressure, which are mounted in the space between an electrode assembly and a top cap of a positive electrode terminal. Here, the safety vent is generally installed at the positive electrode terminal of the secondary battery. When the internal pressure of the secondary battery increases, the safety vent protrudes and ruptures to exhausts the gas. In other words, when the battery operates abnormally, gas is discharged toward the positive electrode terminal at which the safety vent is installed.

The heat dissipation and gas discharge structure of the conventional multilayer cylindrical secondary battery pack is as follows in consideration of the above characteristics of the cylindrical secondary battery. For example, the cylindrical secondary batteries are separated into layers to include a first cylindrical secondary battery group arranged in the first layer and a second cylindrical secondary battery group arranged in the second layer. At this time, the cylindrical secondary batteries are arranged in two patterns. In the first pattern, positive electrode terminals of the first and second cylindrical secondary battery groups face each other based on the center portion thereof, and negative electrode terminals are arranged at an uppermost end or a lowermost end. In the second pattern, the negative electrode terminals of the first and second cylindrical secondary battery groups face each other based on the center portion thereof, and the positive electrode terminals are arranged at the uppermost end or the lowermost end.

In the first pattern, the heat dissipation structure is applied to the negative electrode terminal located at the uppermost end and the lowermost end to facilitate heat dissipation to the outside. However, if the heat dissipation structure is applied to the positive electrode terminals facing each other in a vertical direction in a middle region, it is difficult to secure a gas discharge space for preventing chain ignition.

In the second pattern, a cooling plate is installed between the negative electrode terminals facing each other in a vertical direction in a middle region, and the heat is discharged to the outside through the cooling plate. Here, a gas discharge space may be easily secured at the positive electrode terminal located at the uppermost end and the lowermost end, but it is difficult to add the heat dissipation structure thereto.

In addition, in case of a multilayer battery module having the conventional heat dissipation and gas discharge space securing structure as described above, the negative electrode terminals of the first and second cylindrical secondary battery groups should face each other or face in the opposite direction. In this case, the electrical connection structure between the batteries becomes complicated. Thus, there is a need for a method of effectively securing the heat dissipation and gas discharge space even when the cylindrical secondary batteries layered in a vertical direction are arranged so that terminals having different polarities face each other in a middle region, unlike the conventional case.

DISCLOSURE

Technical Problem

The present disclosure is designed to solve the problems of the related art, and therefore the present disclosure is directed to providing a multilayer battery module, in which a heat dissipation and chain ignition prevention structure is applied to a cylindrical battery cell assembly where positive electrode terminals and negative electrode terminals are arranged to face each other in a vertical direction with space efficiency, and a battery pack including the multilayer battery module.

Technical Solution

In one aspect of the present disclosure, there is provided a multilayer battery module, comprising: first cylindrical battery cells disposed to stand up and arranged in lateral and longitudinal directions into a matrix form; second cylindrical battery cells disposed to stand up and arranged on the first cylindrical battery cells in one-to-one relationship; and a heatsink made of a material with high thermal conductivity and disposed at a layer boundary between the first cylindrical battery cells and the second cylindrical battery cells, wherein the first cylindrical battery cells and the second cylindrical battery cells are disposed so that positive electrode terminals thereof and negative electrode terminals thereof face each other with the heatsink being interposed therebetween, wherein a portion of the heatsink facing the positive electrode terminal is convex toward the positive electrode terminal to form a heat and gas discharge path, and a portion of the heatsink facing the negative electrode terminal is closely adhered to the negative electrode terminal to form a heat dissipation path.

The first and second cylindrical battery cells may be arranged so that upper and lower portions of first and second cylindrical battery cells neighboring along a lateral direction are reversed and upper and lower portions of first and second cylindrical battery cells neighboring along a longitudinal direction are not reversed.

The heatsink may include an uneven portion having an uneven pattern along the lateral direction and having an area corresponding to a lateral and longitudinal arrangement area of the first and second cylindrical battery cells; and a heat dissipation portion having an increased thickness in a vertical direction from at least one edge of the uneven portion and exposed out of the layer boundary of the first and second cylindrical battery cells.

The multilayer battery module may further comprise a plurality of heat transfer pads disposed at top ends and bottom ends of the first and second cylindrical battery cells, respectively, to cover all of negative electrode terminals and a part of positive electrode terminals neighboring in the lateral direction.

The multilayer battery module may further comprise a first cell housing formed to surround a periphery of each of the first cylindrical battery cells; and a second cell housing vertically coupled to the first cell housing with the heatsink being interposed therebetween, the second cell housing being formed to surround a periphery of each of the second cylindrical battery cells.

The heat and gas discharge path may be partitioned into several separate compartments by the uneven portion of the heatsink, an upper surface of the first cell housing and a lower surface of the second cell housing.

The heat dissipation portion may be provided in plural so that the plurality of heat dissipation portions are discontinuous along a longitudinal direction of the heatsink, and the multilayer battery module may further comprise a coupling plate disposed vertically between the heat dissipation portions and coupled to side surfaces of the first cell housing and the second cell housing.

The first cell housing and the second cell housing may include side protrusions respectively formed to protrude from side surfaces thereof to compress the heat dissipation portion in the vertical direction.

In another aspect of the present disclosure, there is also provided a multilayer battery pack, comprising: the multilayer battery module described above; and a pack case configured to accommodate the multilayer battery module, wherein the pack case includes a case body configured to integrally surround a side periphery of the multilayer battery module; and a case upper plate and a case lower plate respectively coupled to a top end and a bottom end of the case body to cover an upper portion and a lower portion of the multilayer battery module.

An inner surface of the case upper plate may be separated from and convex toward the positive electrode terminals located at top ends of the second cylindrical battery cells and is closely adhered to the negative electrode terminals of the second cylindrical battery cells, and an inner surface of the case lower plate may be separated from and convex toward the positive electrode terminals located at bottom ends of the first cylindrical battery cells and is closely adhered to the negative electrode terminals of the first cylindrical battery cells.

The case body may have a gas venting hole formed at a height where the heatsink is located.

Advantageous Effects

The multilayer battery module according to the present disclosure may have a heat dissipation and gas discharge space to easily discharge the heat and gas generated from the cylindrical battery cells to a layer boundary at which the positive electrode terminals and the negative electrode terminals face each other in a vertical direction.

Thus, even though heat and gas are generated in any one of the cylindrical battery cells concentrated in a narrow space, it is possible to prevent other neighboring cylindrical battery cells from being ignited or exploded in a chain.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
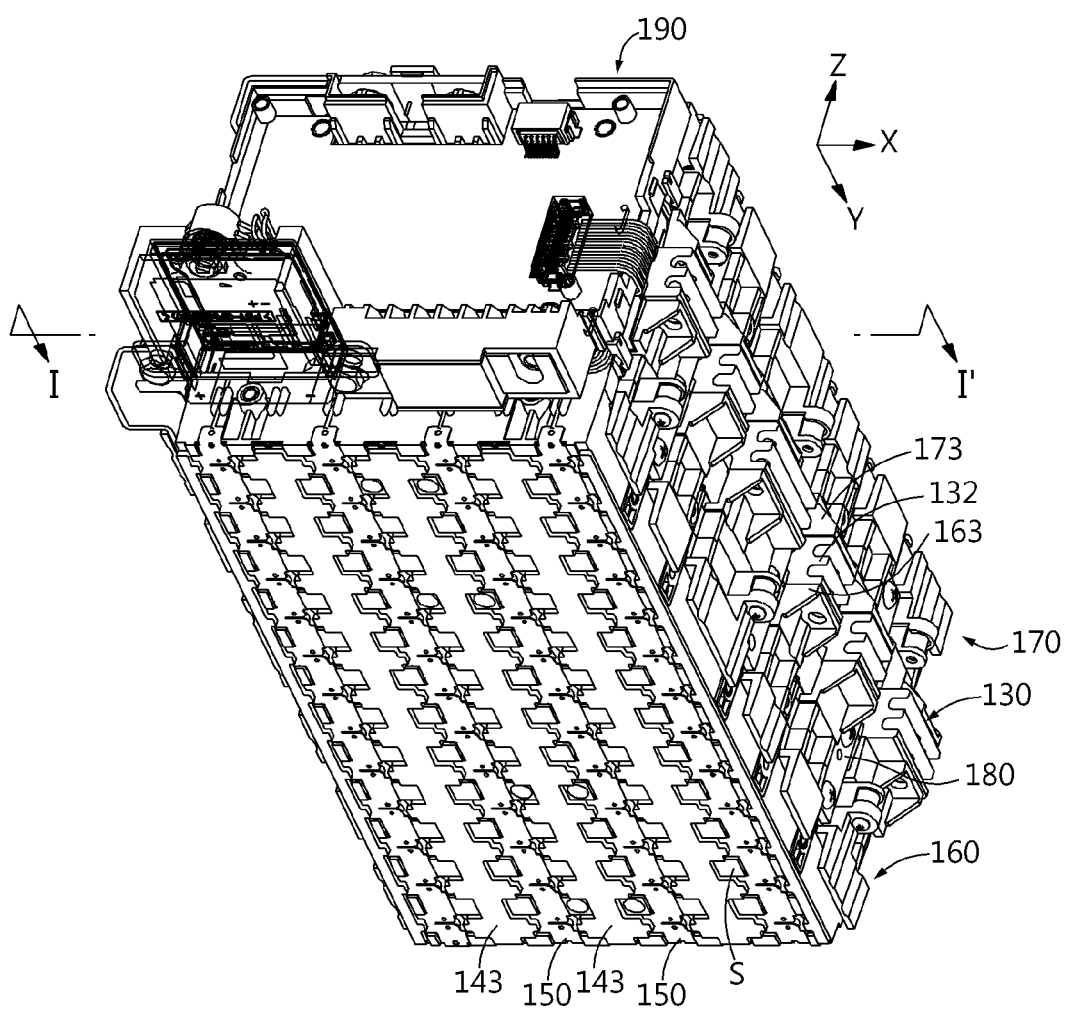
FIG. 1 is a perspective view showing a multilayer battery module according to an embodiment of the present disclosure.
Figure 2:
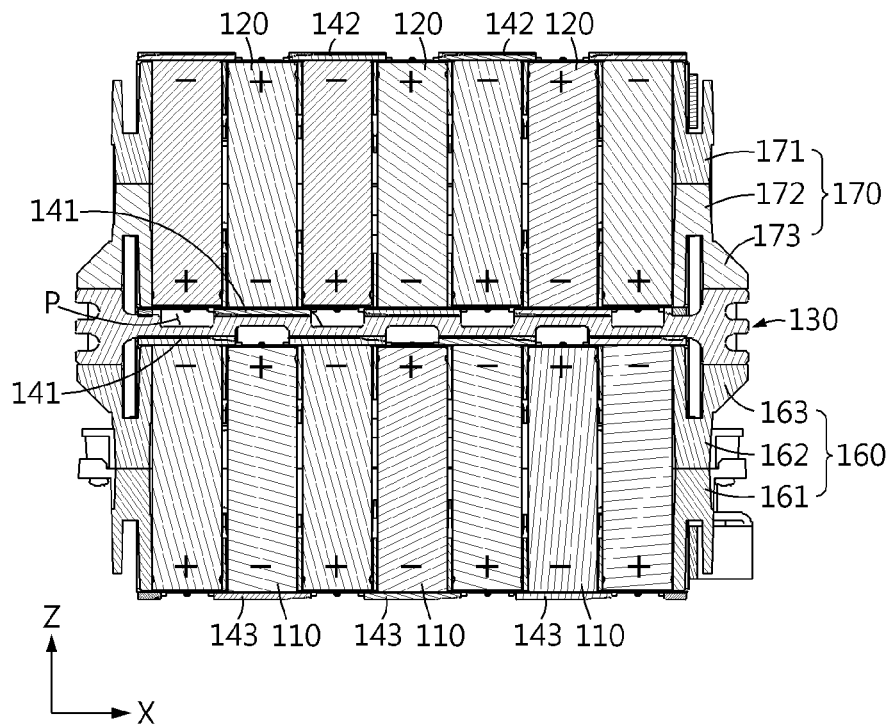
FIG. 2 is a cross-sectioned view, taken along the line I-I' of FIG. 1.
Figure 3:
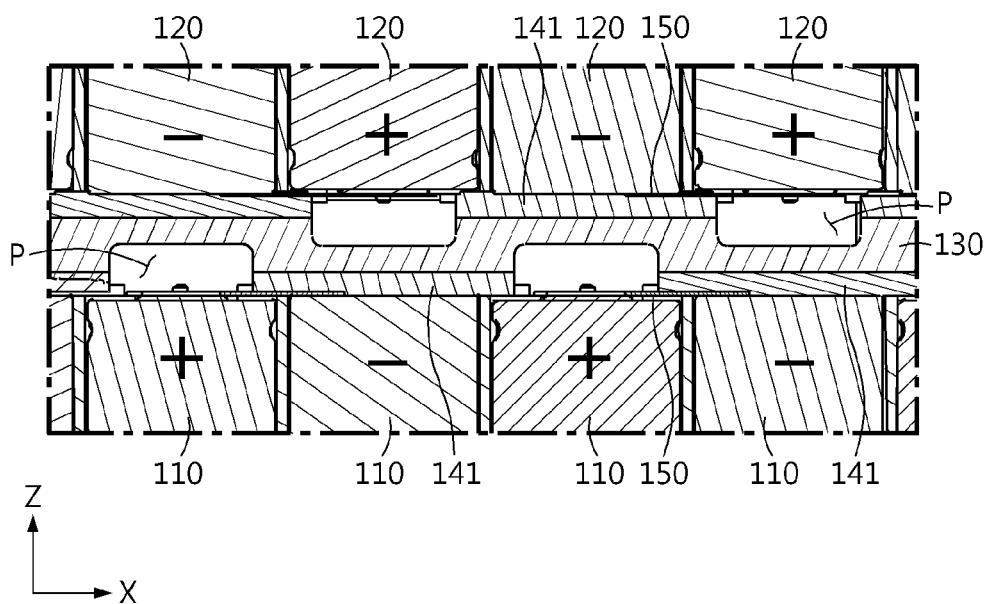
FIG. 3 is an enlarged view showing a layer boundary portion of first and second cylindrical battery cells of FIG. 2.
Figure 4:
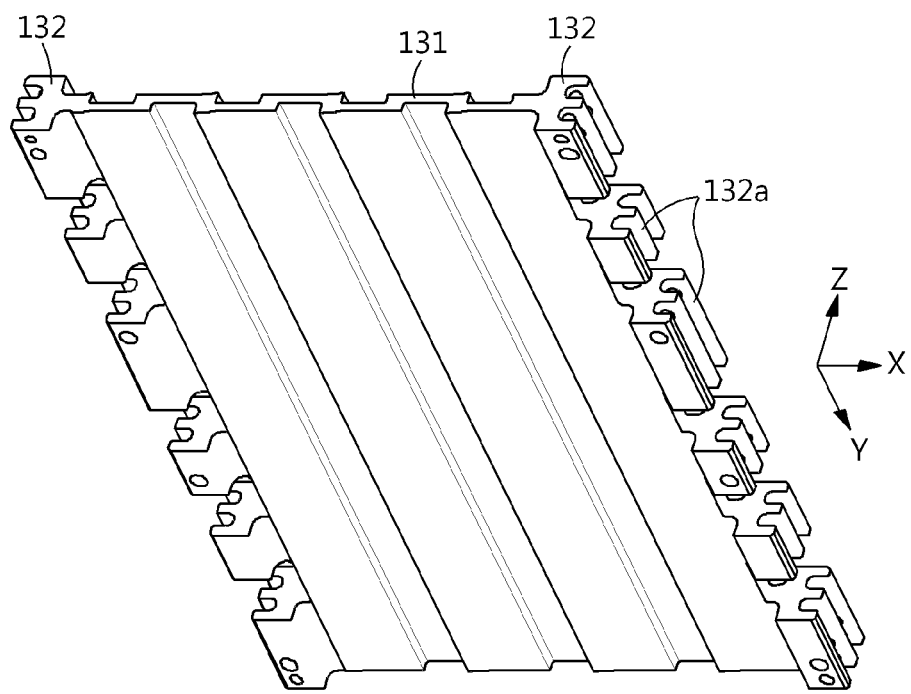
FIG. 4 is a perspective view showing a heatsink of FIG. 1.

FIG. 1 is a perspective view showing a multilayer battery module according to an embodiment of the present disclosure, FIG. 2 is a cross-sectioned view, taken along the line I-I' of FIG. 1, FIG. 3 is an enlarged view showing a layer boundary portion of first and second cylindrical battery cells of FIG. 2, and FIG. 4 is a perspective view showing a heatsink of FIG. 1.

Referring to these figures, a multilayer battery module 100 according to an embodiment of the present disclosure includes first and second cylindrical battery cells 110, 120, first and second cell housings 160, 170 for respectively accommodating the first and second cylindrical battery cells 110, 120 and vertically coupled to each other, and a heatsink 130 interposed between the first and second cell housings 160, 170.

The cylindrical battery cells are stacked in two layers. Here, it may be understood that the first cylindrical battery cells 110 are disposed on the first layer, and the second cylindrical battery cells 120 are disposed on the second layer. In addition, the heatsink 130 is located at a layer boundary of the first cylindrical battery cells 110 and the second cylindrical battery cells 120.

The first and second cylindrical battery cells 110, 120 are conceptually classified according to upper and lower positions thereof, and the first and second cylindrical battery cells 110, 120 have the same configuration. Here, the cylindrical battery cell includes, for example, an electrode assembly in a jelly-roll form, a cylindrical battery case for accommodating an electrolyte together with the electrode assembly, a positive electrode terminal formed at a top end of the battery case, a negative electrode terminal formed at a bottom end of the battery case.

In this embodiment, the cylindrical battery cell may be fabricated such that a top cap forming the positive electrode terminal is separated from the battery case or a gas hole is formed at the top cap, so as to prevent the cylindrical battery cell from being exploded since the internal pressure of cylindrical battery cell increases rapidly due to the gas generated in the cell during a charging and discharging process.

Figure 8:
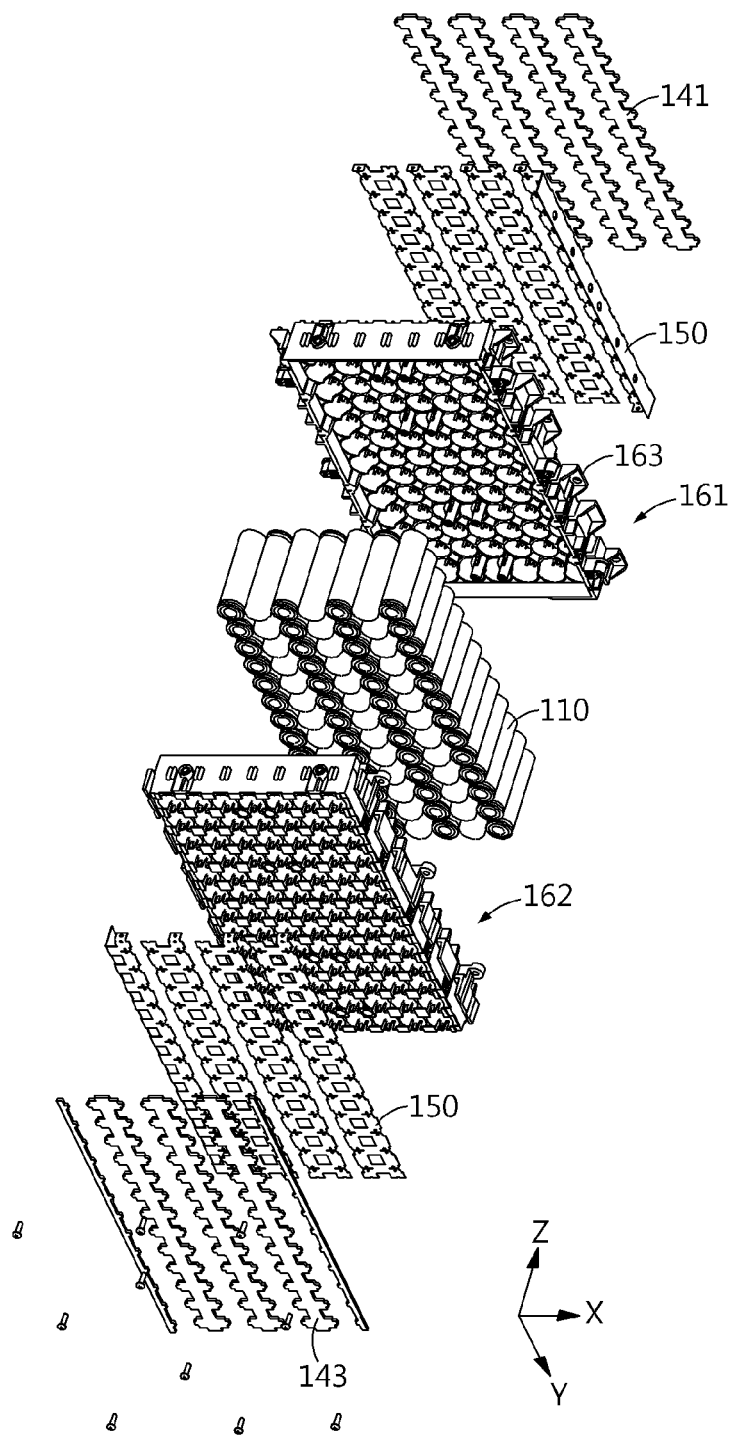
FIG. 8 is an exploded perspective view showing a first cell housing of FIG. 7.

Referring to FIGS. 2 and 8 together, the first cylindrical battery cells 110 may be arranged in lateral and longitudinal directions into a matrix form in a state where the positive electrode terminals and the negative electrode terminals stand up toward an upper side or a lower side (Here, the lateral direction means ±X-axis direction and the longitudinal direction means ±Y-axis direction based on the coordinates shown in each figure).

More specifically, the first cylindrical battery cells 110 may be arranged such that first cylindrical battery cells neighboring in the lateral direction are reversed and the first cylindrical battery cells neighboring in the longitudinal direction are not reversed. For example, the upper and lower portions of the cylindrical battery cells in each row are reversed in the X-axis direction so that the polarities at the top and the bottom thereof are alternately reversed, and the upper and lower portions of the cylindrical battery cells in each column are not reversed in the Y-axis direction so that the polarities at the top and the bottom thereof are identical to each other (see FIGS. 2 and 8 together).

The second cylindrical battery cells 120 may be disposed on the first cylindrical battery cells 110 and arranged in lateral and longitudinal directions into a matrix form to correspond to the first cylindrical battery cells 110 in one-to-one relationship. In addition, the second cylindrical battery cells 120 are also arranged such that second cylindrical battery cells neighboring in the lateral direction have different polarities at top and bottom ends thereof and second cylindrical battery cells neighboring in the longitudinal direction have the same polarity at the top and bottom ends thereof, similar to the first cylindrical battery cells 110.

At this time, the first cylindrical battery cells 110 and the second cylindrical battery cells 120 having different polarities are disposed to face each other, based on the heatsink 130 located in the middle of the multilayer battery module 100, namely between the layers the multilayer battery module 100. For example, in each row, the positive electrode terminal of the first cylindrical battery cell 110 is disposed to vertically face the negative electrode terminal of the second cylindrical battery cell 120, and the negative electrode terminal of the first cylindrical battery cell 110 is disposed to vertically face the positive electrode terminal of the second cylindrical battery cell 120.

If the first and second cylindrical battery cells 110, 120 are arranged as above, the cylindrical battery cells may be connected in series and/or in parallel more easily, compared to the case where the top and bottom ends of the cylindrical battery cells in each row and column are arranged to have the same polarity.

Meanwhile, in the general multilayer battery module 100, a center portion where the first and second cylindrical battery cells 110, 120 face each other, namely a layer boundary portion of the first and second cylindrical battery cells 110, 120, has a high heat accumulation rate, and when gas is generated, the gas is not easily discharged, compared to an outer portion. The present disclosure is designed to solve this problem by applying the heatsink 130 to the center portion where the first and second cylindrical battery cells 110, 120 face each other, so as to smoothly perform heat dissipation and gas discharge.

As shown in FIG. 4, the heatsink 130 may include an uneven portion 131 having an uneven pattern along the lateral direction and having an area corresponding to a lateral and vertical arrangement area of the first and second cylindrical battery cells 110, 120, and a heat dissipation portion 132 having an increased thickness from at least one edge of the uneven portion 131 and exposed out of the layer boundary of the first and second cylindrical battery cells 110, 120. In this embodiment, the heat dissipation portion 132 is provided at two edges of the uneven portion 131, and a plurality of heat dissipation fins 132a diverged into several branches are provided at the heat dissipation portion 132 to ensure a sufficient heat dissipation area.

The heatsink 130 may be made of aluminum or aluminum alloy, among metal materials with high thermal conductivity. The heatsink 130 of the present disclosure is not limited to aluminum. For example, copper, gold or silver may be used, and ceramic materials such as aluminum nitride and silicon carbide other than metal are also available.

For reference, since heat is generated greatest at the electrode terminal during charging and discharging, it is effective to cool the positive electrode terminal and the negative electrode terminal of the cylindrical battery cell. However, if the positive electrode terminal is covered with the heat dissipation portion 132, the gas generated in the cylindrical battery cell may not be smoothly discharged, and thus the cylindrical battery cell may be highly likely to be exploded due to the increased pressure. Thus, in the present disclosure, the heat of the cylindrical battery cell is dissipated mainly through the negative electrode terminal, and the heatsink 130 is formed at the top portion of the positive electrode terminal to secure a gas discharge space.

Specifically, the uneven portion 131 of the heatsink 130 is provided so that a portion facing each positive electrode terminal of the first and second cylindrical battery cells 110, 120 is convex toward the positive electrode terminal, thereby forming a gas discharge path for discharging gas generated in the cylindrical battery cell. Also, a portion of the uneven portion 131 of the heatsink 130 facing each negative electrode terminal of the first and second cylindrical battery cells 110, 120 may be closely adhered to the negative electrode terminal to form a heat dissipation path leading to the heat dissipation portion 132.

Figure 5:
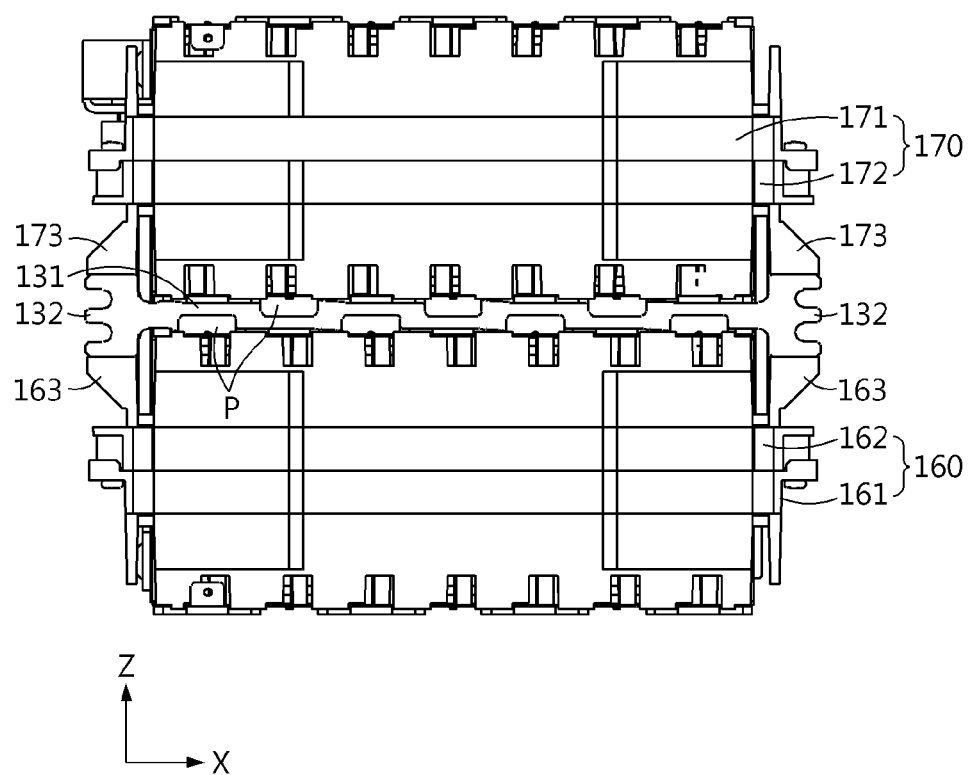
FIG. 5 is a rear view of FIG. 1.
Figure 6:
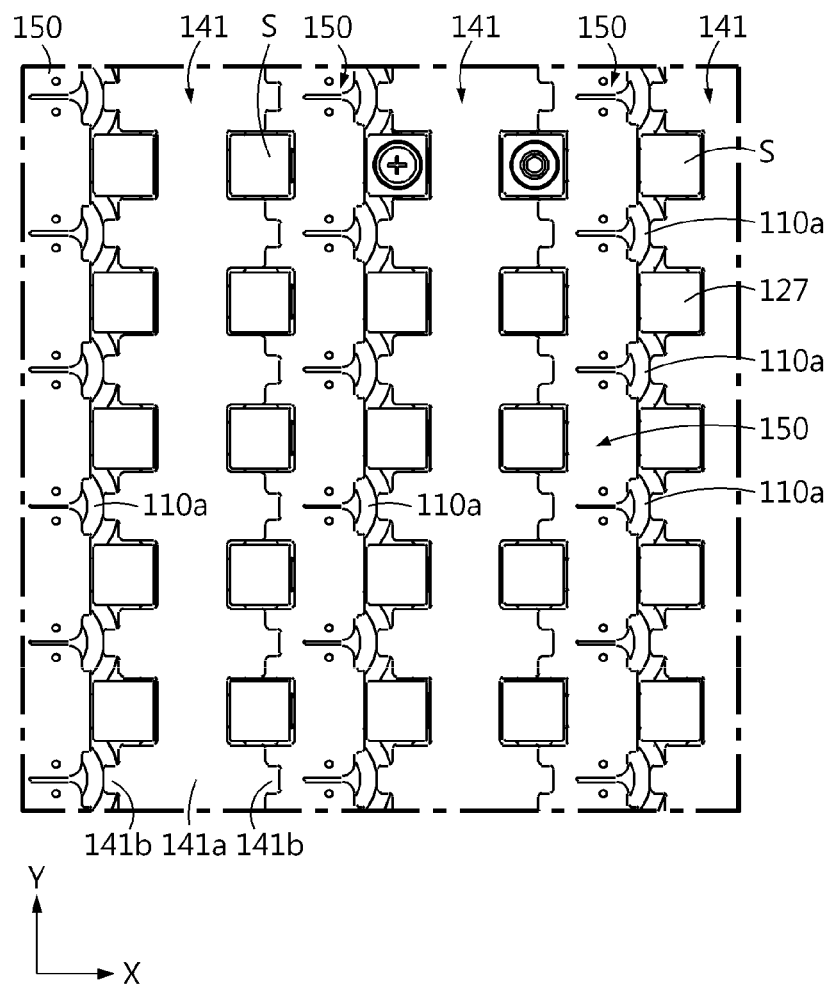
FIG. 6 is a diagram showing a portion of a top end of the first cylindrical battery cells according to an embodiment of the present disclosure.
Figure 7:
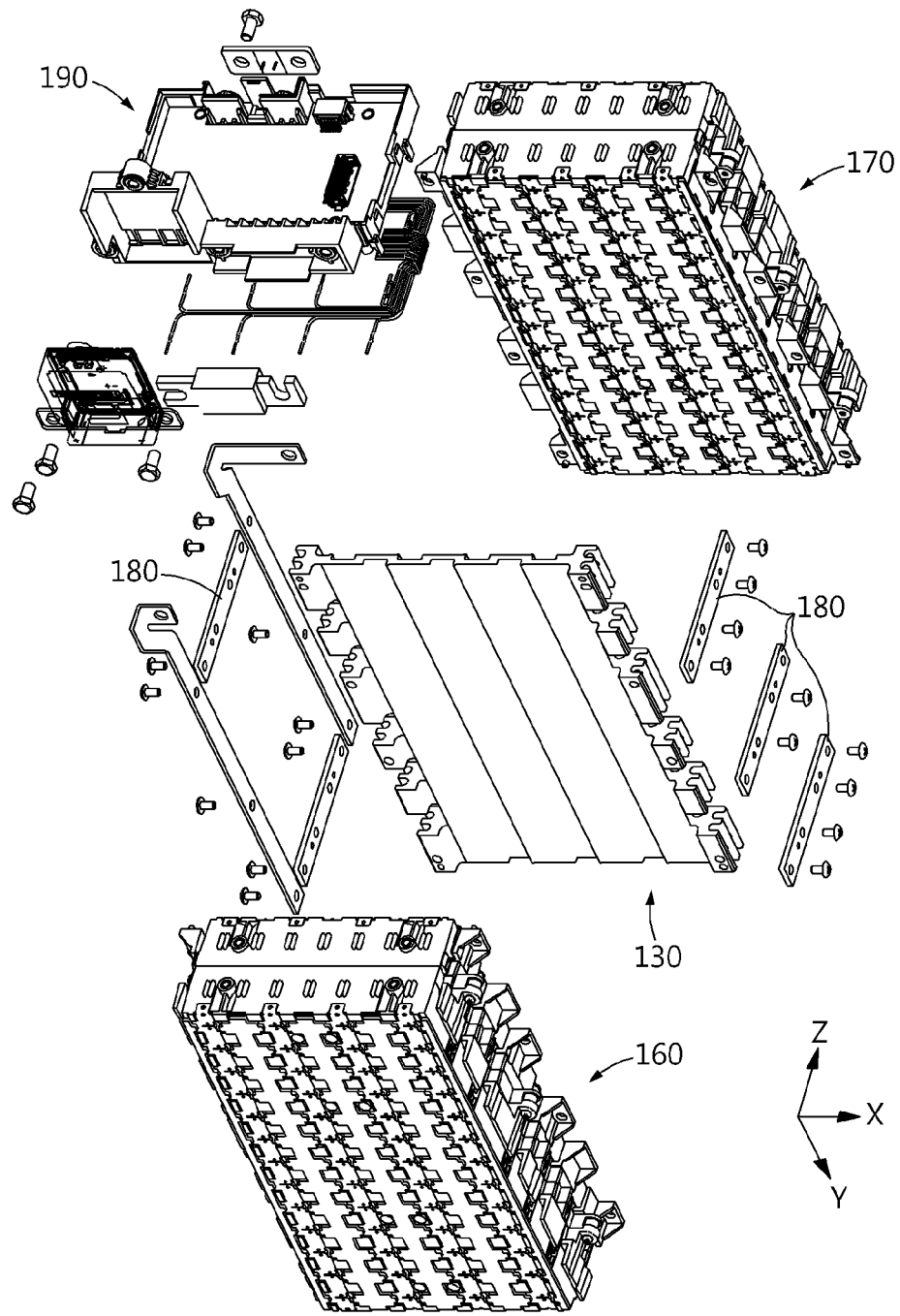
FIG. 7 is an exploded perspective view of FIG. 1.

As shown in FIG. 5, the gas discharge paths P of each row may communicate with at least one of front and rear surfaces of the battery module 100 along the longitudinal direction (Y-axis direction). For example, a BMS housing 190 in which a BMS circuit board and other electrical components are assembled is mounted to a front side of the battery module 100 of this embodiment, and the gas discharge path P communicates with the outside through a rear portion of the battery module 100.

In addition, the uneven portion 131 of the heatsink 130 absorbs the heat generated from the negative electrode terminals of the first and second cylindrical battery cells 110, 120. Since the heat dissipation portion 132 of the heatsink 130 exposed out of the battery module 100 has a relatively lower temperature than the uneven portion 131, the heat absorbed by the uneven portion 131 may be transferred to the heat dissipation portion 132 and discharged to the outside.

At this time, in order to improve the thermal conductivity, heat transfer pads may be interposed between the first and second cylindrical battery cells 110, 120 and the heatsink 130. The heat transfer pad is made of a thermally conductive material and transfers heat between the heatsink 130 and the positive or negative electrode terminal.

The heat transfer pad may be fixed to the heatsink 130 and the positive or negative electrode terminal by means of an adhesive. By doing so, it is possible to prevent the heat transfer pad from moving, and an air layer between the heat transfer pad and the heatsink 130 or an air layer between the heat transfer pad and the positive or negative electrode terminal may be removed or reduced to increase the heat transfer efficiency.

The heat transfer pads according to the present disclosure may be disposed at the top end and the bottom end of each of the first and second cylindrical battery cells 110, 120 to cover a part of the positive electrode terminals neighboring in the lateral direction and all of the negative electrode terminals together.

The heat transfer pads are conceptually classified into a first heat transfer pad 141, a second heat transfer pad 142 and a third heat transfer pad 143 depending on their positions. Here, the first to third heat transfer pads 143 are arranged in the same pattern. Thus, the construction and arrangement of the first heat transfer pad 141 will be described in detail and the second and third heat transfer pad 142, 143 will not be described in detail.

For example, referring to FIGS. 2 to 3 and 6 to 8 together, the positive electrode terminals 110a and the negative electrode terminals located at the top ends of the first cylindrical battery cells 110 may be electrically connected to each other by several metal plates 150 extending in the longitudinal direction. Here, the metal plate 150 is an electrically conductive component made of copper or aluminum that electrically connects the cylindrical battery cells, and the metal plate 150 is attached to partially cover the positive electrode terminals 110a and the negative electrode terminals.

The first heat transfer pad 141 may be alternately arranged with the metal plates 150 along the X-axis direction to cover the upper portions of the positive electrode terminals 110a and the negative electrode terminals. In other words, the first heat transfer pad 141 may cover the entire area of the negative electrode terminal and cover only the edge area of the neighboring positive electrode terminal 110a.

More specifically, the first heat transfer pad 141 may include a strap portion 141a extended by a longitudinal arrangement length of the cylindrical battery cells and branch portions 141b extending at the strap portion 141a in left and right direction at predetermined intervals.

The strap portion 141a covers the upper portion of all negative electrode terminals along the longitudinal direction, and the branch portions 141b cover a part of the edges of the positive electrode terminals adjacent to each negative electrode terminal in the left and right directions.

If the first heat transfer pad 141 is used, not only the negative electrode terminal but also a part of the edge of the positive electrode terminal 110a may contact the first heat transfer pad 141, so that the heat of the first and second cylindrical battery cells 110, 120 may be rapidly conducted from the positive electrode terminal and the negative electrode terminal to the heatsink 130 via the first heat transfer pad 141. In addition, since the upper portions of the positive electrode terminals are not completely covered by the first heat transfer pad 141 and the metal plate 150, gas may be discharged from the positive electrode terminal at emergency.

Referring to FIGS. 1, 2, 5 and 7 again, the multilayer battery module 100 according to the present disclosure may further include a first cell housing 160 made of upper and lower cases configured to be vertically coupled to each other to respectively surround the peripheries of the first cylindrical battery cells 110, and a second cell housing 170 made upper and lower cases configured to be vertically coupled to each other to respectively surround the peripheries of the second cylindrical battery cells 120. In addition, the first and second cell housings 160, 170 may be symmetrically coupled with each other with the heatsink 130 being interposed therebetween.

Since the uneven portion 131 of the heatsink 130 has an uneven structure in the X-axis direction, when the heatsink 130 is disposed horizontal to the top surface of the first cell housing 160 and the bottom surface of the second cell housing 170, the top portion and the bottom portion of the uneven portion 131 are covered to form a long heat and gas discharge path P in the Y-axis direction. At this time, the heat and gas discharge path P is partitioned into several separate compartments by the uneven portion 131 of the heatsink 130, the upper surface of the first cell housing 160, and the lower surface of the second cell housing 170. For example, the gas discharge paths P of each row may communicate with at least one of the front surface and the rear surface of the battery module 100 along the longitudinal direction (Y-axis direction) based on the first and second cylindrical battery cells 110, 120. The battery module 100 of this embodiment is configured such that a BMS circuit board and other electrical components are mounted to the front side thereof and the gas discharge path P communicates with the outside through the rear side thereof.

In this case, even though the positive electrode terminal of any one cylindrical battery cell is broken to generate heat and gas, the heat and gas may be quickly discharged out of the battery module. Also, since the upper and lower portions and the left and right portions of the battery module are partially blocked the heatsink 130, it is possible to minimize the effect applied to other cylindrical battery cells.

The heat dissipation portion 132 of the heatsink 130 may be exposed to the outside at both side surfaces of the first and second cell housings 160, 170. In addition, the first and second cell housings 160, 170 may be connected into a single body by a coupling plate 180.

The heat dissipation portion 132 of the heatsink 130 may be provided in plural, and the plurality of heat dissipation portions 132 may be discontinuous along the longitudinal direction (Y-axis direction) of the heatsink 130. The coupling plate 180 may be vertically disposed between the heat dissipation portions 132 and fixed to the first and second cell housings 160, 170 by a fastening means such as a screw or a bolt. The coupling plate 180 may be fixedly mounted to both side surfaces of the first and second cell housings 160, 170, respectively.

According to this coupling configuration, the first and second cell housings 160, 170 may be strongly restrained, and also the heatsink 130 located between the first and second cell housings 160, 170 may not move at all in the upper, lower, left and right directions.

In addition, the first and second cell housings 160, 170 may further include side protrusions 163, 173 respectively formed to protrude from the side surfaces thereof to press the heat dissipation portion 132 of the heatsink 130 in a vertical direction.

As shown in FIG. 5, the heat dissipation portion 132 of the heatsink 130 exposed to the outside may be compressed by the side protrusions 163, 173 of the first and second cell housings 160, 170 not to move. Also, although not shown in the figure, the side protrusions 163, 173 of the first and second cell housings 160, 170 and the heat dissipation portion 132 of the heatsink 130 may be integrally fixed to each other by vertically fastening a bolt or screw.

As described above, the heatsink 130 may be firmly fixed to the first and second cell housings 160, 170 by the coupling plate 180 disposed between the heat dissipation portions 132 of the heatsink 130 and the side protrusions 163, 173 pressing the top and bottom portions of the heat dissipation portion 132 of the heatsink 130.

Meanwhile, as shown in FIG. 8, the first and second cell housings 160, 170 may respectively include upper cases 161, 171 and lower cases 162, 172, which may be vertically coupled to each other.

The upper and lower cases 161, 171, 162, 172 surround the outer surfaces of the cylindrical battery cells, and the top and bottom ends thereof may be exposed to the outside. For example, the upper and lower cases 161, 171, 162, 172 may include cell holders capable of inserting individual cylindrical battery cells therein and may be vertically coupled to each other to surround the outer surfaces of the cylindrical battery cells.

In addition, the top end of the upper case 161, 171 and the bottom end of the lower case 162, 172 may have rectangular pieces S which may support the cylindrical battery cells without separating from the cell holder when the cylindrical battery cells are inserted.

In addition to the above components, the multilayer battery module 100 may further include various devices for controlling charge and discharge of the first and second cylindrical battery cells 110, 120, for example a BMS, a current sensor, a fuse, and the like.

Subsequently, referring to FIGS. 9 to 12, a multilayer battery pack 10 will be described. The multilayer battery pack 10 according to an embodiment of the present disclosure includes the multilayer battery module 100 described above and a pack case 200 configured to package the multilayer battery module 100 therein. For reference, the multilayer battery pack 10 of this embodiment is designed to include one multilayer battery module 100, but the present disclosure is not necessarily limited thereto. For example, unlike this embodiment, the multilayer battery pack 10 may include two or more multilayer battery modules 100 stacked vertically and/or horizontally.

The pack case 200 of this embodiment includes a case body 210, and a case upper plate 220 and a case lower plate 230 for covering an upper portion and a lower portion of the case body 210.

The case body 210 may have a substantially tetrahedral shape that integrally surrounds the entire side periphery of the multilayer battery module 100 with a size corresponding to the volume of the multilayer battery module 100. A positive electrode terminal, a negative electrode terminal and other communication ports may be provided at the front surface of the case body 210, and a gas venting hole 211 may be provided at the rear surface of the case body 210. The heat or gas emitted from the multilayer battery module 100 may be discharged out of the battery pack 10 through the gas venting hole 211.

Figure 9:
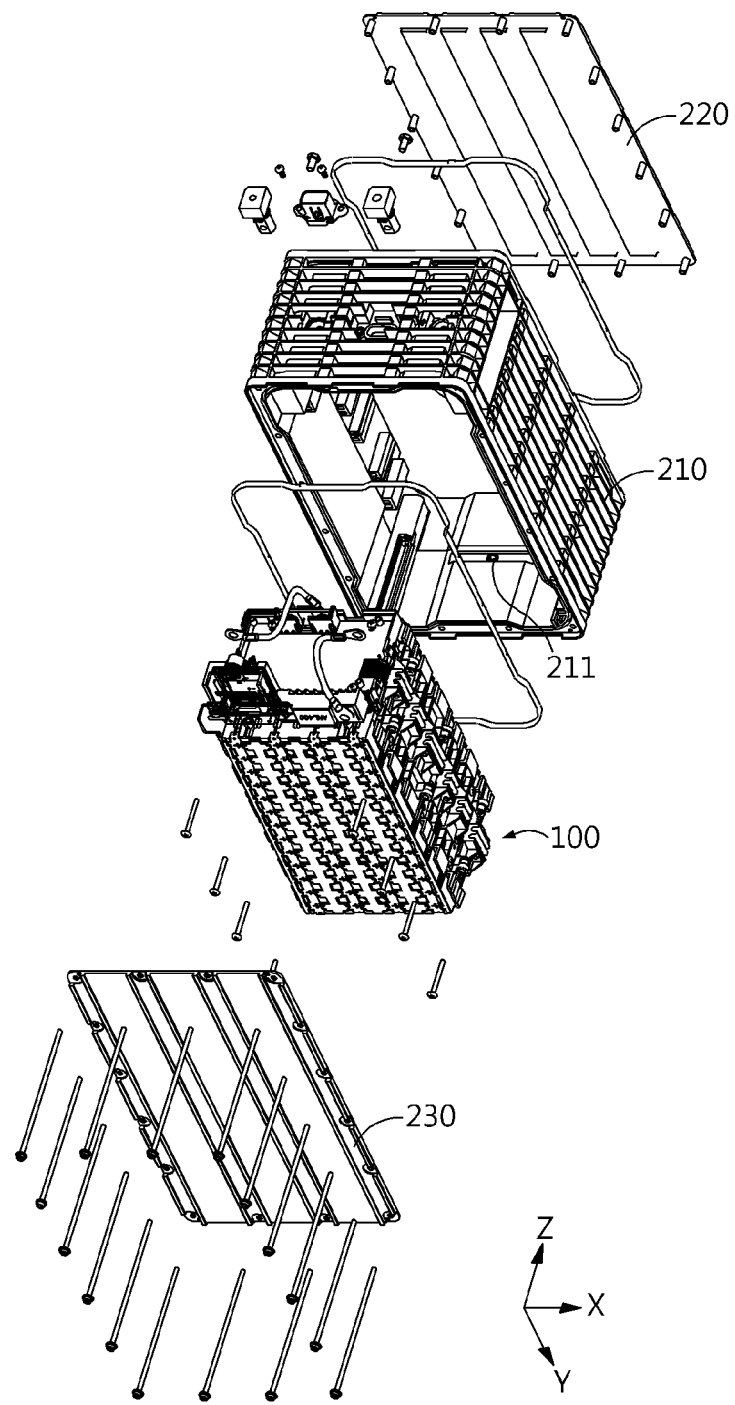
FIG. 9 is an exploded perspective view showing a multilayer battery pack according to an embodiment of the present disclosure.
Figure 10:
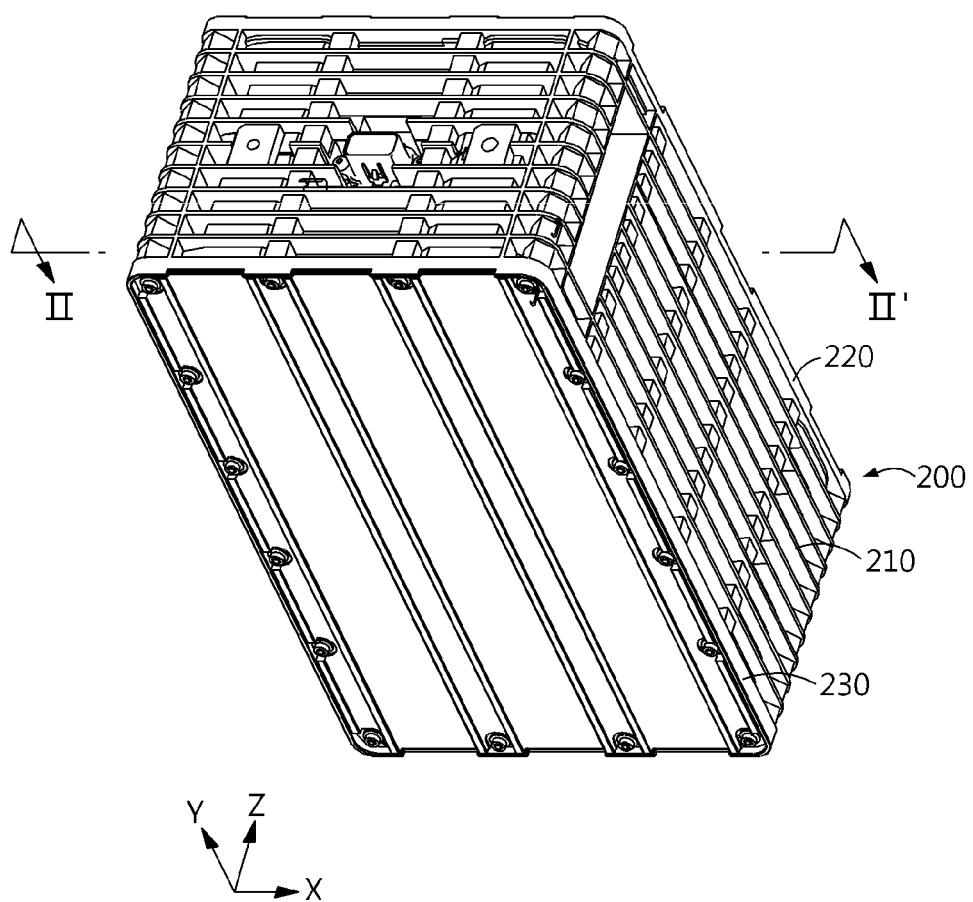
FIG. 10 is a perspective view showing the multilayer battery pack of FIG. 9 in an assembled state.
Figure 11:
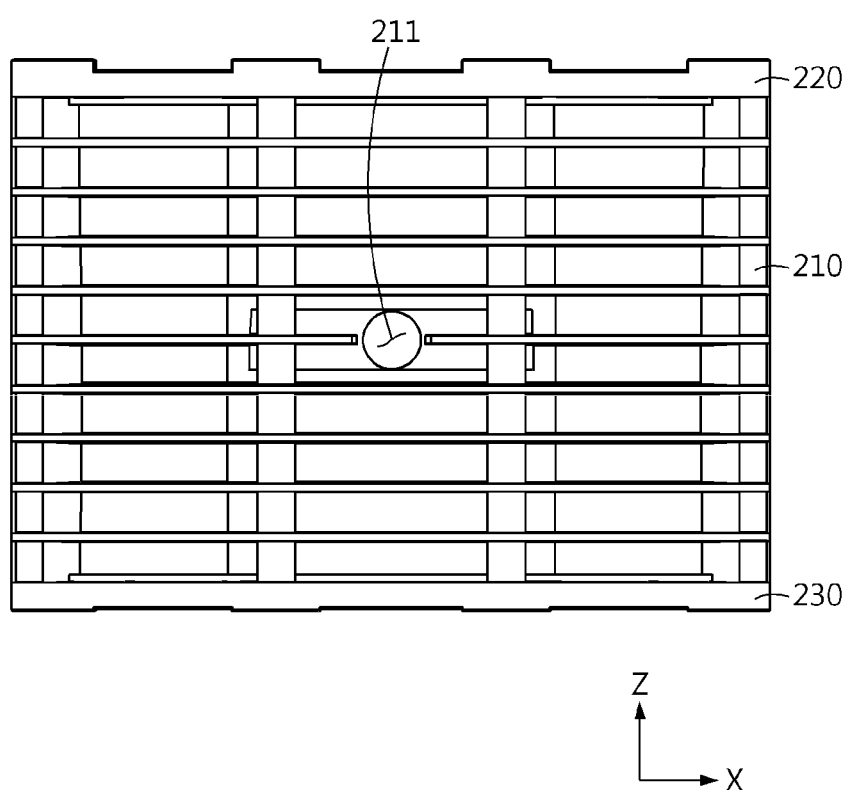
FIG. 11 is a rear view of FIG. 10.

The gas venting hole 211 may be provided at a height where the heatsink 130 is located when the multilayer battery module 100 is accommodated in the pack case 200. For example, as shown in FIGS. 9 and 11, the gas venting hole 211 is provided at the same height as the heat and gas discharge path P, which communicates with the outside through the rear surface of the multilayer battery module 100, at the inside of the multilayer battery module 100. In this case, since the gas venting hole 211 faces the heat and gas discharge path P of the battery module 100 at the same height, the gas may be discharged out of the battery pack 10 more smoothly.

Figure 12:
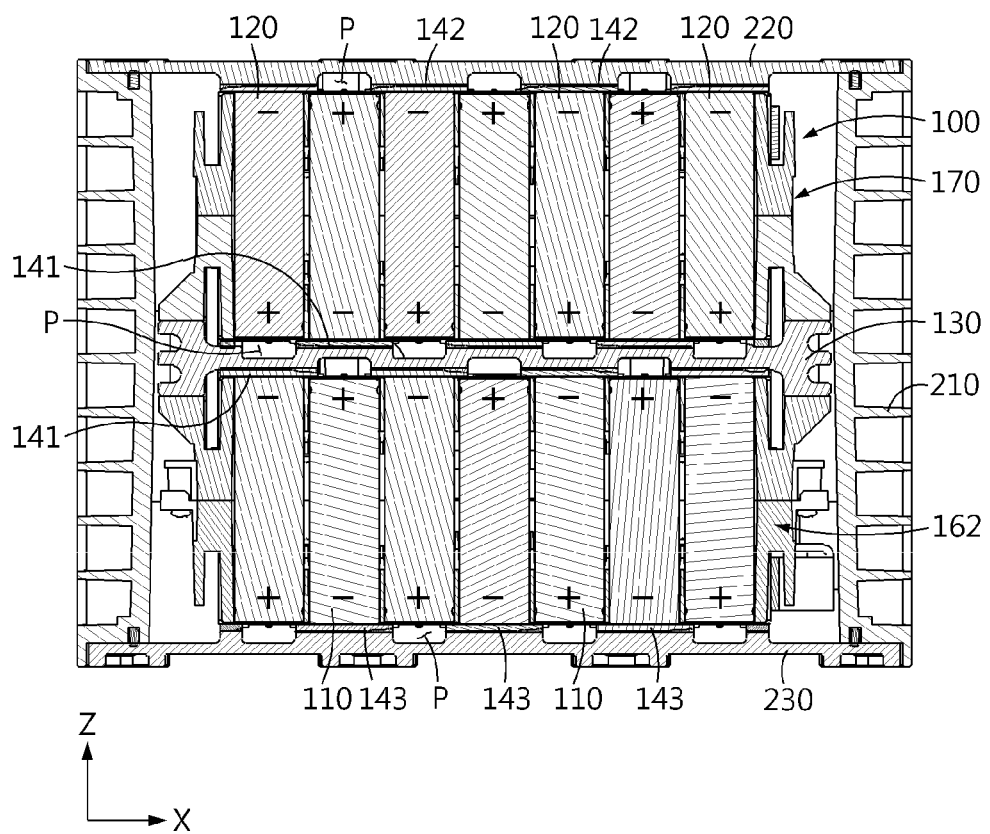
FIG. 12 is a cross-sectioned view, taken along the line II-IF of FIG. 10.

In addition, as shown in FIG. 12, when the case upper plate 220 is mounted to the case body 210, the inner surface of the case upper plate 220 is separated from and convex toward the positive electrode terminal located at the top end of the second cylindrical battery cells 120 and is closely adhered to the negative electrode terminal.

Thus, the heat and gas discharge path P may also be formed at the upper portion of the second cylindrical battery cell 120, similar to the layer boundary of the first and second cylindrical battery cells 110, 120. In addition, a second heat transfer pad 142 may be additionally attached to the case upper plate 220 that is in contact with the negative electrode terminals, in order to increase the thermal conductivity from the negative electrode terminals.

The case lower plate 230 has a structure similar to the case upper plate 220. When the case lower plate 230 is mounted to the case body 210, the inner surface of the case lower plate 230 is separated from and convex toward the positive electrode terminal located at the bottom end of the first cylindrical battery cells 110 and is closely adhered to the negative electrode terminal. Thus, the heat and gas discharge path P may also be formed at the lower portion of the first cylindrical battery cell 110, similar to the layer boundary of the first and second cylindrical battery cells 110, 120. In addition, a second heat transfer pad 142 may be additionally attached to the case upper plate 220 that is in contact with the negative electrode terminals, in order to increase the thermal conductivity from the negative electrode terminals.

That is, the case upper plate 220 and the case lower plate 230 according to the present disclosure may be used to secure the heat dissipation and gas discharge space, similar to the heatsink 130 described above, together with the function of protecting the battery module from external impacts. Thus, the case upper plate 220 and the case lower plate 230 may be preferably made of a metal material with excellent mechanical rigidity and excellent thermal conductivity.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

Meanwhile, when the terms indicating up, down, left, right, front and rear directions are used in the specification, it is obvious to those skilled in the art that these merely represent relative locations for convenience in explanation and may vary based on a location of an observer or an object to be observed.

What is claimed is:

1. A multilayer battery module, comprising:
   first cylindrical battery cells arranged standing in lateral and longitudinal directions into a matrix form;
   second cylindrical battery cells arranged standing on the first cylindrical battery cells with each one of the second cylindrical battery cells in a one-to-one relationship with a corresponding one of the first cylindrical battery cells; and
   a heatsink of high thermal conductivity between the first cylindrical battery cells and the second cylindrical battery cells,
   wherein the first cylindrical battery cells and the second cylindrical battery cells are disposed so that positive electrode terminals and negative electrode terminals face each other with the heatsink being interposed therebetween for each corresponding ones of the first and second cylindrical battery cells,
   wherein a portion of the heatsink facing each respective positive electrode terminal is recessed to form a heat and gas discharge path, and a portion of the heatsink facing each respective negative electrode terminal contacts the respective negative electrode terminal to form a heat dissipation path,
   wherein the first cylindrical battery cells are arranged so orientations of the positive and negative terminals along a lateral direction are alternated with respect to adjacent ones of the first cylindrical battery cells and orientations of positive and negative terminals along a longitudinal direction are the same, and
   wherein the second cylindrical battery cells are arranged so orientations of the positive and negative terminals along a lateral direction are alternated with respect to adjacent ones of the second cylindrical battery cells and orientations of positive and negative terminals along a longitudinal direction are the same.

2. The multilayer battery module according to claim 1, wherein the heatsink includes:
   an uneven portion having an uneven pattern along the lateral direction and having an area corresponding to an area of the first and second cylindrical battery cells; and
   a heat dissipation portion having an increased thickness in a vertical direction from at least one edge of the uneven portion and exposed out of the layer boundary of the first and second cylindrical battery cells.

3. The multilayer battery module according to claim 1, further comprising:
   a plurality of heat transfer pads at top ends and bottom ends of the first and second cylindrical battery cells, respectively, such that the heat transfer pads cover all of the negative electrode terminals and a part of the positive electrode terminals.

4. The multilayer battery module according to claim 2, further comprising:
   a first cell housing surrounding a periphery of each of the first cylindrical battery cells; and
   a second cell housing vertically coupled to the first cell housing with the heatsink being interposed therebetween, the second cell housing surrounding a periphery of each of the second cylindrical battery cells.

5. The multilayer battery module according to claim 4, wherein the heat and gas discharge path is partitioned into several separate compartments by the uneven portion of the heatsink, an upper surface of the first cell housing and a lower surface of the second cell housing.

6. The multilayer battery module according to claim 4, wherein the heat dissipation portion is provided in plural, and the plurality of heat dissipation portions are discontinuous along a longitudinal direction of the heatsink, and
   wherein the multilayer battery module further comprises a coupling plate disposed vertically between the heat dissipation portions and coupled to side surfaces of the first cell housing and the second cell housing.

7. The multilayer battery module according to claim 4, wherein the first cell housing and the second cell housing include side protrusions respectively formed to protrude from side surfaces thereof to compress the heat dissipation portion in the vertical direction.

8. A multilayer battery pack, comprising:
   a multilayer battery module defined in claim 1; and
   a pack case configured to accommodate the multilayer battery module,
   wherein the pack case includes:
   a case body configured to integrally surround a side periphery of the multilayer battery module; and
   a case upper plate and a case lower plate respectively coupled to a top end and a bottom end of the case body to cover an upper portion and a lower portion of the multilayer battery module.

9. The multilayer battery pack according to claim 8, wherein an inner surface of the case upper plate is separated from the positive electrode terminals located at top ends of the second cylindrical battery cells and contacts the negative electrode terminals of the second cylindrical battery cells, and
   wherein an inner surface of the case lower plate is separated from the positive electrode terminals located at bottom ends of the first cylindrical battery cells and contacts the negative electrode terminals of the first cylindrical battery cells.

10. The multilayer battery pack according to claim 9, wherein the case body has a gas venting hole formed at a height where the heatsink is located.

* * * * *